(12) United States Patent
Chen et al.

(10) Patent No.: US 7,697,275 B2
(45) Date of Patent: Apr. 13, 2010

(54) SHOCK RESISTANT MOUNTING FOR SMALL DISPLAY SCREEN

(75) Inventors: Chao Chen, Waterloo (CA); Robert William Phillips, Waterloo (CA); Timothy Herbert Kyowski, Brantford (CA)

(73) Assignee: Research In Motion Limited, Waterloo, Ontario (CA)

( * ) Notice: Subject to any disclaimer, the term of this patent is extended or adjusted under 35 U.S.C. 154(b) by 1542 days.

(21) Appl. No.: 10/933,264

(22) Filed: Sep. 3, 2004

(65) Prior Publication Data

US 2006/0061859 A1    Mar. 23, 2006

(51) Int. Cl.
*G06F 1/16* (2006.01)

(52) U.S. Cl. .................. 361/679.3; 349/58

(58) Field of Classification Search ............... 349/58, 349/60; 361/681, 679.3; 359/443
See application file for complete search history.

(56) References Cited

U.S. PATENT DOCUMENTS

| | | | | |
|---|---|---|---|---|
| 3,807,833 | A * | 4/1974 | Graham et al. ............... 349/60 |
| 4,165,607 | A * | 8/1979 | Fedorowicz et al. .......... 368/88 |
| 4,652,973 | A | 3/1987 | Baker et al. |
| 4,718,855 | A | 1/1988 | Billman et al. |
| 5,270,847 | A * | 12/1993 | Sano ........................... 349/60 |
| 5,358,412 | A * | 10/1994 | Maurinus et al. ............. 439/66 |
| 5,450,221 | A * | 9/1995 | Owen et al. .................. 349/58 |
| 5,479,285 | A * | 12/1995 | Burke .......................... 349/58 |
| 5,570,267 | A * | 10/1996 | Ma .............................. 361/681 |
| 5,936,600 | A * | 8/1999 | Ohashi et al. ................. 345/87 |
| 5,940,153 | A * | 8/1999 | Castaneda et al. ............ 349/58 |
| 6,002,582 | A * | 12/1999 | Yeager et al. ................ 361/681 |
| 6,064,453 | A * | 5/2000 | Inubushi et al. .............. 349/58 |
| 6,181,548 | B1 | 1/2001 | Wheeler |
| 6,229,695 | B1 * | 5/2001 | Moon ....................... 361/679.3 |
| 6,350,133 | B2 * | 2/2002 | Christensen et al. .......... 439/66 |
| 6,462,938 | B1 * | 10/2002 | Horne et al. ............. 361/679.28 |
| 6,507,377 | B1 * | 1/2003 | Jung ........................... 349/60 |
| 6,603,710 | B1 * | 8/2003 | Pantet et al. .................. 368/84 |
| 6,654,232 | B1 * | 11/2003 | Tsao et al. ............. 361/679.59 |
| 6,762,806 | B1 * | 7/2004 | Matsuo et al. ................ 349/58 |
| 6,788,894 | B2 * | 9/2004 | Suzuki et al. ............... 396/287 |

(Continued)

FOREIGN PATENT DOCUMENTS

EP       1387607       2/2004

(Continued)

*Primary Examiner*—Lisa Lea-Edmonds
(74) *Attorney, Agent, or Firm*—Borden Ladner Gervais LLP; Jeffrey W. Wong (57) ABSTRACT

The display screen unit of a cell phone or PDA is carried in a mounting frame, which is bolted into the casing. The screen unit is sandwiched between cushioning layers of foam. The screen unit can move laterally, relative to the mounting frame, putting the foam in shear, in response to an edge or corner impact. Springy tabs are bent up from the metal backing plate of the screen unit, and these springy tabs serve to cushion the impact of the screen unit against the mounting frame, in response to the edge or corner impact, leading to a marked improvement in drop test performance. As a production-line benefit, the springy tabs also permit the screen unit to rest on the lip of the mounting frame, enabling the screen unit to be accurately positioned in the mounting frame just before the screen unit is finally pressed down into contact with the securing adhesive.

16 Claims, 5 Drawing Sheets

U.S. PATENT DOCUMENTS

| | | | |
|---|---|---|---|
| 6,842,333 B2 * | 1/2005 | Lee et al. | 361/679.55 |
| 6,909,475 B2 * | 6/2005 | Kojima et al. | 349/58 |
| 6,917,517 B1 * | 7/2005 | Iida | 455/347 |
| 6,956,628 B2 * | 10/2005 | Huang | 349/58 |
| 7,130,185 B2 * | 10/2006 | Chen et al. | 361/679.3 |
| 7,239,503 B2 * | 7/2007 | Chen | 361/681 |
| 7,395,095 B2 * | 7/2008 | Schrack | 455/569.1 |
| 2003/0189681 A1 | 10/2003 | Han et al. | |
| 2004/0113532 A1 * | 6/2004 | Oishi et al. | 313/110 |

FOREIGN PATENT DOCUMENTS

| | | |
|---|---|---|
| EP | 1 499 095 | 1/2005 |
| EP | 1633176 A1 * | 3/2006 |
| JP | 11202787 | 7/1999 |

* cited by examiner

FIG 11

SHOCK RESISTANT MOUNTING FOR SMALL DISPLAY SCREEN

This specification relates to such hand-held electronic products as cell-phones, personal digital assistants (PDAs), cameras, etc, which include a display or video screen.

One of the encountered difficulties has been that the screen is fragile. Yet hand-held devices are very likely to be dropped, or otherwise abused, occasionally, by the user. Although the user might expect that (repeated) dropping will render the product inoperable, still the prudent manufacturer seeks to make the product as robust as possible. The technology described herein is concerned with improvements in the manner of mounting the screen, with the aim of reducing damage due to impacts.

Providing cushions of foam material (poron) front and back of the screen unit is effective to prevent damage from impacts front and back. But it is when the device is dropped so that the screen is impacted on its edge that a major potential for damage arises. Now, the whole weight of the screen unit may be concentrated perhaps onto one impacting corner. The glass components of the screen unit are polarised, which exacerbates the tendency of microcracks to propagate through the glass.

Another encountered difficulty has been that of accurately positioning the screen during production-line assembly. Screens for hand-held devices are usually mounted in foam, for its shock-absorbing properties, and the screen is glued to the foam. The type of adhesive used is of the stick-on-contact type, whereby the screen must be located to what will be its final position before it touches the adhesive, and it is all too easy for the screen to be slightly misaligned or misplaced. The technology described herein is concerned with the manner in which the screen is located and positioned just prior to contact with the adhesive foam, with the aim of improving accuracy of positioning on a repeatable, production-line basis.

The technology described is aimed at providing a space all around the fragile glass components of the screen unit. It is aimed at bringing the screen unit gently to rest, within that space, when the device is dropped. It is aimed at ensuring that the (glass) components are protected from impacts of sufficient violence to cause damage. And it is aimed at doing these things repeatedly.

Space inside a hand-held electronic device is at a tight premium. It is very demanding to provide sufficient space around the screen unit to enable the screen unit to be brought gently to rest after an impact. If the designer also has to provide an additional margin of tolerance, to cater for the screen unit being inaccurately positioned, misaligned, misplaced etc, within the space, the demands can hardly be met. The technology is aimed at ensuring the screen unit is so accurately placed that the margin for positional tolerance can be reduced or eliminated.

The apparatuses shown in the accompanying drawings and described below are examples. The scope of the patent protection sought is defined by the accompanying claims, and not necessarily by specific features of exemplary embodiments.

Figure 1:
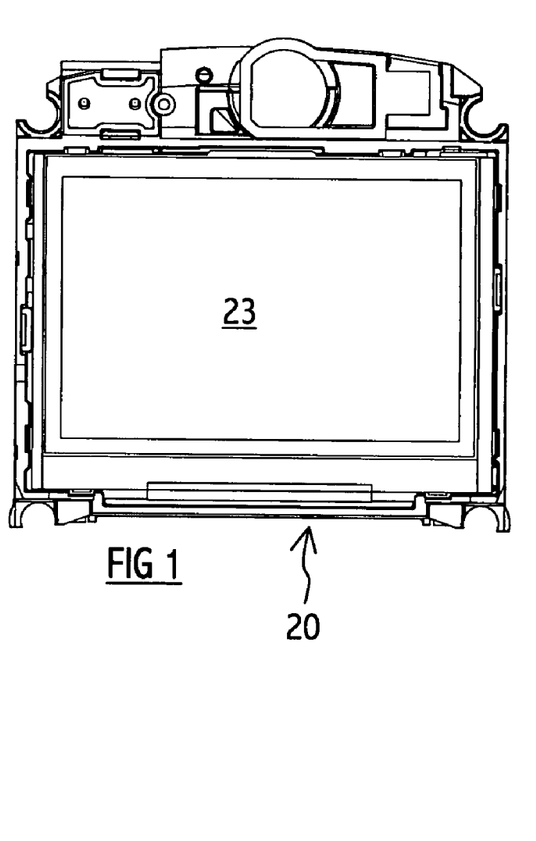
FIG. 1 is a plan view of a mounted screen assembly.
Figure 2:
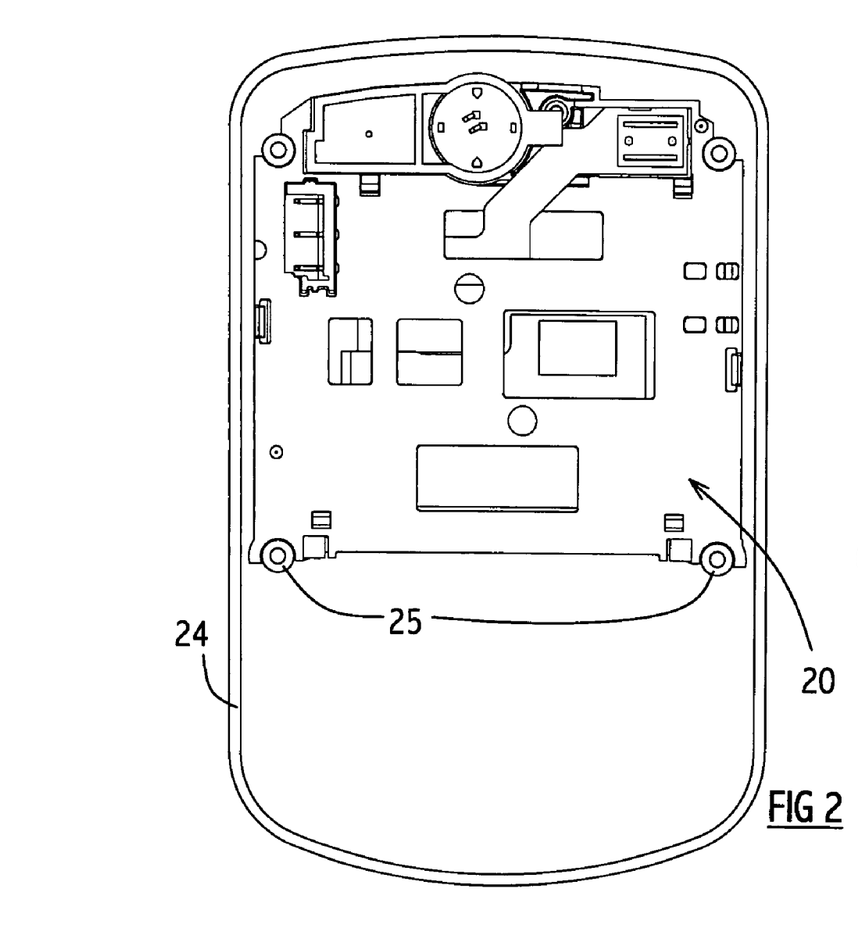
FIG. 2 is a reverse plan view of the mounted screen assembly of FIG. 1, in combination with (part of) a hand-held electronic device.

The apparatus shown in FIG. 1 is a mounted screen assembly 20, having a display screen 23. FIG. 2 shows the (back of the) mounted screen assembly 20, assembled into the casing 24 of a PDA, and secured rigidly to the casing by means of four bolt-down fittings 25.

Figure 3:
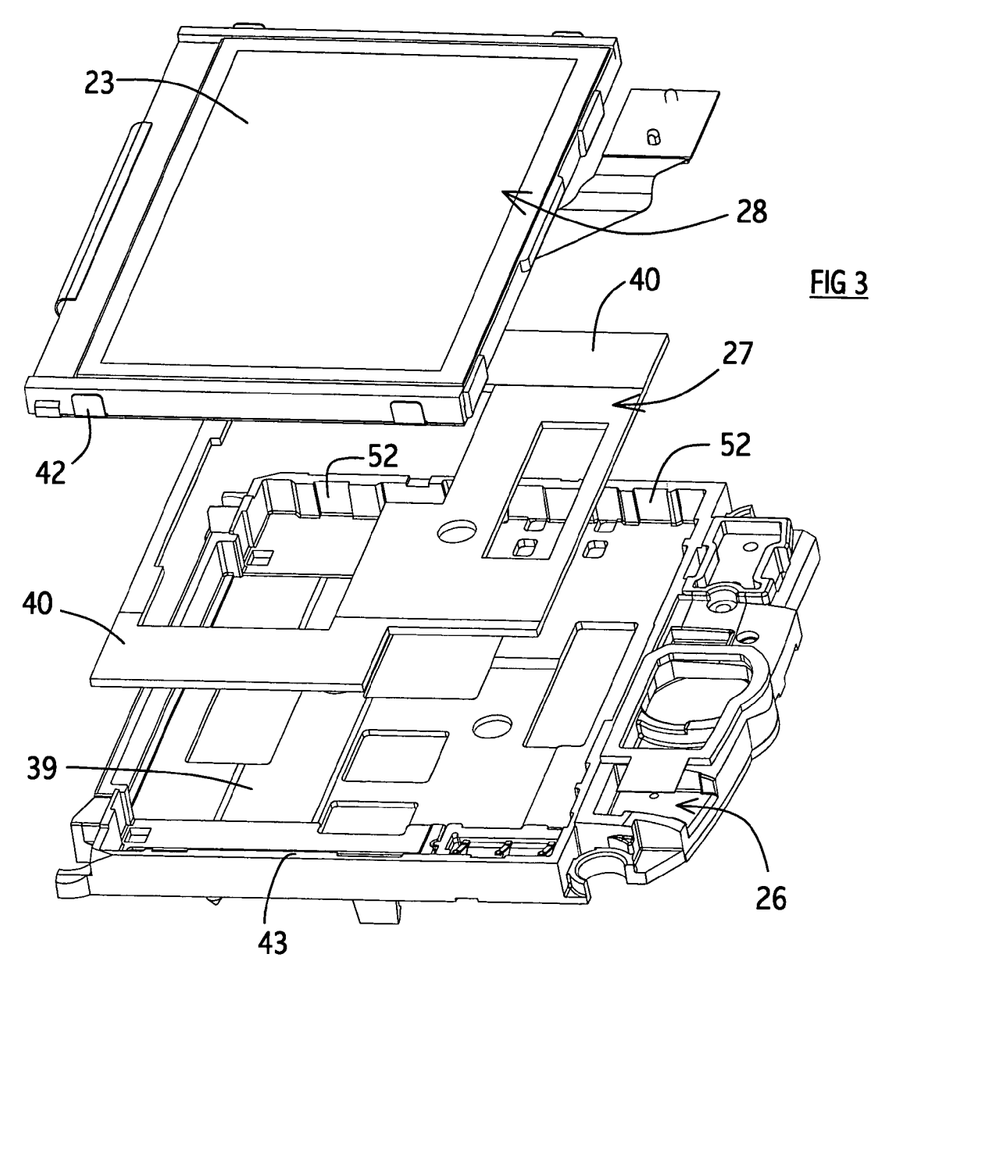
FIG. 3 is an exploded view showing the components of the mounted screen assembly of FIG. 1, being the mounting frame, the foam buffer, and the screen unit.

FIG. 3 shows the components of the mounted screen assembly 20. These are (a) a mounting frame 26, comprising a plastic moulding; (b) a foam buffer 27, comprising a punched-out sheet of plastic resilient porous foam; and (c) the screen unit 28.

Figure 4:
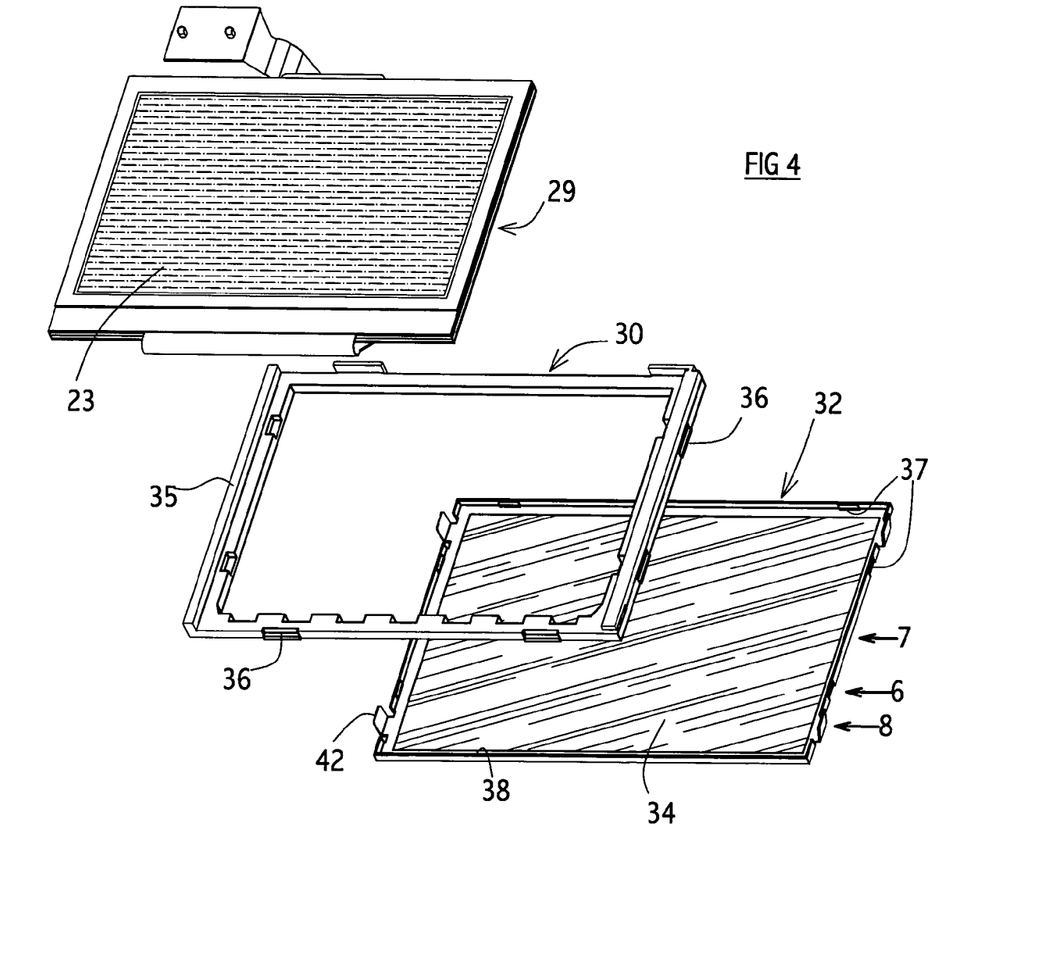
FIG. 4 is an exploded view showing the components of the screen unit of FIG. 3, being the screen stack, the plastic shell, and the backing plate.

FIG. 4 shows some of the components of the screen unit 28. These are (a) the display stack 29, which comprises a stack of layers, the topmost of which is the display screen 23 itself; (b) a shell 30, comprising a plastic moulding; and (c) a backing plate 32. The backing plate 32 is bent and folded from a sheet of stainless steel, and incorporates a polished reflector surface 34.

The several layers that make up the display stack 29 are a tight fit between the ledged sides 35 of the moulded shell 30. The metal backing plate 32 is crimped to the shell 30, whereby, together, the stack 29, the shell 30, and the backing plate 32 constitute the integrated screen unit 28, being the structure that is to be protected from impacts.

Figure 6:
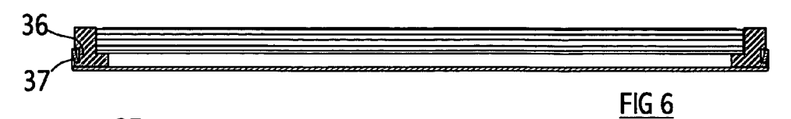
FIG. 6 is a cross-section on line 6 of FIG. 4 of the screen unit.
Figure 7:
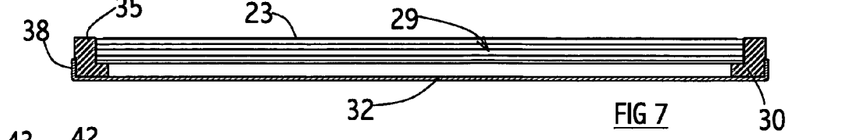
FIG. 7 is a cross-section on line 7 of FIG. 4 of the screen unit.

The crimping involves the provision of shaped recesses 36 in the plastic shell 30, and the provision of tags [32] 37 in the upstanding metal rim 38 of the backing plate 32. FIG. 6 shows a cross-section of the screen unit in the area of the crimps, and FIG. 7 is a cross-section away from the crimps.

The crimped screen unit 28 can now be assembled, as a rigid unified single component, into the mounting frame 26. The underside of the foam sheet 27 is pre-glued on top of the baseplate 39 of the mounting frame 26. The foam sheet 27 is provided, on its upper side, with stripes 40 of adhesive. The adhesive in the stripes 40 is protected by covering strips (not shown), the strips being peeled off just prior to the backing plate 32 being lowered down into touching contact with the adhesive.

Figure 8:
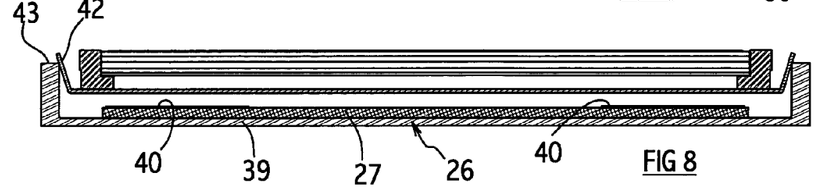
FIG. 8 is a cross-section on line 8 of FIG. 4 of the screen unit, showing the screen unit in position just prior to its final assembly into the mounting frame.
Figure 9:
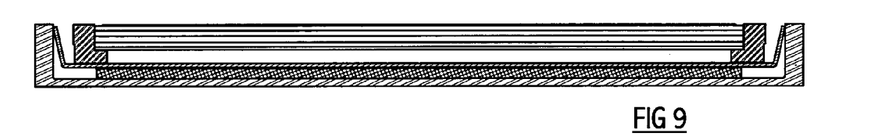
FIG. 9 is similar to FIG. 8, but shows the screen unit finally assembled into the mounting frame, forming the mounted screen assembly.

The manner of assembly is shown in FIGS. 8 and 9. In FIG. 8, the springy tabs 42 protruding from the backing plate 32 of the screen unit 28 engage with, and rest on, the lips 43 of the plastic mounting frame 26, whereby the screen unit 28 is held slightly separated from, and just clear of, the (exposed) adhesive stripes 40. FIG. 9 shows the screen unit 28 having been pressed down until the underside of the backing plate 32 contacts the stripes 40. After that, the screen unit 28 remains firmly adhered to the mounting frame 26.

Figure 10:
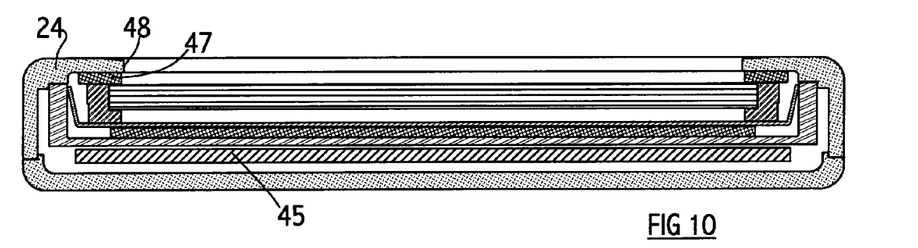
FIG. 10 is the same view as FIG. 9, but includes components of the electronic device.

The now-completed mounted screen assembly 20 can now be bolted into the casing 24, as described. FIG. 10 shows some of the other components of the device, in side cross-section. The circuit board 45 and other components are housed inside the casing.

The manner in which the screen unit 28 is fixed into the casing of the PDA may be contrasted with the manner in which that task has been done in the conventional designs. The differences attributable to the provision and function of the springy tabs 42 will now be described.

One of the problems with a hand-held electronic device is that such devices are prone to being dropped. In fact, manufacturers have a program of drop tests; typically, the devices are classed as being robust enough and sturdy enough if, in e.g eighty percent of the devices, when the devices are dropped from a height of so many feet onto a concrete floor, the screen remains intact and functioning. The drop test may specify that the device be dropped so that it lands on one corner, and/or lands flat-on, etc.

The conventional designs have tended to perform only modestly in these drop tests. Of course, it is always possible to protect the screen more effectively from such abuse—but not, hitherto, without substantial compromises and penalties by way of extra cost, extra weight, and extra occupied space—the latter being perhaps the most acute.

It should be noted that the trend, in PDA and cell phone design, has been to add more and more features of performance, increasing the demand for premium space inside the casing, and yet at the same time the designer is pressured to reduce the overall size of the product. In some respects, continuing engineering improvement has meant that components do improve in terms of the compromise between cost, size, weight, robustness, etc, and performance features. However, the pressure in the direction of improving resolution, increasing screen size, colour, brightness, etc, tends to render the latest screens, if anything, less rather than more robust.

One of the difficulties is that the display screen includes polarised glass, which is inherently more prone to the propagation of micro-cracks than is ordinary glass, and therefore inherently less able to stand up to drop tests.

Figure 11:
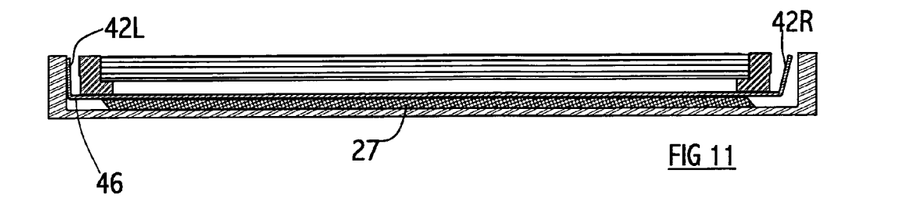
FIG. 11 is similar to FIG. 9, but shows the screen unit moved hard over to the left, within the mounting frame.

The springy tabs 42 assist in protecting the fragile screen unit 28 from the violence of the drop test. FIG. 11 shows the effect on the screen unit of the device striking a hard object to the left side. By its inertia, the screen unit 28 surges leftwards, within the mounting frame 26. The foam material 27 deflects in a shear mode, as shown. The left side springy tab 42L becomes compressed while the right side springy tab 42R relaxes. These strains—in the springy tabs and in the foam—absorb the energy of the impact, allowing the screen unit to come gently to rest, under controlled deceleration, before the screen unit can impact against anything hard and rigid.

It may be noted that, even if the impact should carry the screen unit 28 even further to the left than is shown in FIG. 11, the springy tab 42L can deflect a little further (although now with an increased spring-rate), in that the root area 46 of the backing plate 32, at the base of the springy tab 42L, can undergo (slight) twisting and curling, without the backing plate (or anything else) taking a permanent set. Thus, even after an impact that takes the screen unit 28 even further to the left than is shown in FIG. 11, with the resulting further distortions of the backing plate itself, immediately after the impact the backing plate and the other components revert to their FIG. 9/FIG. 10 positions.

The springy tabs should not be so stiff, of course, that the impact of the tabs themselves puts such a large deceleration into the screen unit as to damage it. Equally, the springy tabs should not be so flimsy that they do not properly inhibit the screen unit from impacting into the mounting frame.

It is suggested that the impact absorbing function is adequate when the permitted travel of the screen unit, between the FIG. 9 position and the FIG. 11 position, is at least about one-quarter-millimeter, and preferably a half-millimeter or more. At least from the standpoint of impact absorption, the larger the permitted deflection of the springy tab, the better.

Preferably also, the spring-rate of the springy tab should be such that the force required to cause the screen unit to move to the FIG. 11 position is about twenty or thirty times the weight of the screen unit. It is suggested that the springy tab would be too stiff if it took more than about forty-five times the weight of the screen unit to move the screen unit to FIG. 11, and that the springy tab would be too flimsy if it took less than about ten times the weight of the screen unit to move the screen unit to FIG. 11.

As to dimensions, good results (that is to say, a significant reduction in the number of failures in drop tests) have been obtained, with a screen unit weighing twenty-five grams, when the stainless steel backing plate 32 (and therefore the tab 42) has a thickness of 0.38 mm, and where two tab elements per side have a length (height) of 3.5 mm, and each a width of 3.5 mm. (Thus, a single springy tab having the same impact-cushioning effect as those two tab elements would have a width of seven mm.) It is suggested that the acceptable limits of spring rate of the springy tabs may be set at between one half and double the spring rate of tabs having these dimensions.

It has been mentioned above that the springy tabs 42 enable the screen unit 28 to be positioned accurately, with respect to the mounting frame 26, just before the screen unit 28 is pressed down into final contact with the adhesive stripes 40. Further consideration will now be addressed to this point.

In the conventional designs, it has been quite difficult to position the screen unit accurately within the mounting frame, on a production-line basis. Especially when the screen unit is assembled automatically, there is little opportunity for the screen unit to be unglued and repositioned, if it is misaligned. The misalignment would not be picked up until final (human) inspection. It may be noted that even the smallest angular misalignment can hardly be permitted. If the screen is even slightly perceptibly misaligned or crooked, relative to the casing aperture, even though such misalignment would have no effect on useability, still a user would usually interpret the misalignment as irritating evidence of general low quality in the product.

Similarly, when the screen unit is assembled manually into the mounting frame, while it is possible that the operator might make an attempt to re-position a misaligned screen unit, in practice that cannot be relied on. For manual assembly, the designer would provide a support edge or the like against which the operator can rest the screen unit, just prior to lowering the unit carefully down onto the adhesive. However, providing a support edge, e.g on a production jig, is not preferred.

Thus, however the assembly was done, it was difficult to ensure that the screen unit was positioned properly, repeatedly, on the production line. By contrast, as described herein the screen unit 28 lies perfectly positioned, but clear of the adhesive 40, as in FIG. 8, just before the screen unit is pressed against the adhesive. The production line operative can achieve hitherto unachievable accuracy, repeatable, with very little care, attention, or skill.

Not only should the screen unit be free of any degree of angular misalignment, the screen unit also should not be misplaced laterally, i.e more to the left than to the right. The FIG. 8/FIG. 9 assembly manner ensures that both angular misalignments and translational misplacements are reduced to an imperceptible minimum.

It is stressed that this degree of repeatable accurate positioning does not require placing the screen unit against some solid abutment, as a positioning datum—which might leave the screen unit vulnerable to impacts against that solid abutment. After assembly, the screen unit 28 is able to move in all modes and directions in response to impacts, and to be decelerated in all those modes by the springy tabs, and by being surrounded by foam. The key direction in which impacts do the most damage is when the direction of the impact lies in the plane of the screen 23, and that is when the springy tabs 42 function most effectively.

A front layer 47 of foam is glued to the casing 24, and surrounds the aperture 48 in the casing 24. This foam may or may not be adhesively secured to the margins of the screen unit. It may happen that, for service purposes, it is desired to change e.g the screen unit 28. In that case, the adhesive 40 on the foam that secures the screen unit to the foam should be of the kind that permits separation. The adhesive that secures the foam to the casing should be of the more permanent type.

Mounted as shown, the screen unit 28 is very well protected against impacts. It has often been the case conventionally that a glass cover or lens was placed over the actual display screen, for physical protection. The designer could arrange that it was the glass lens, and not the glass components of the screen unit, that struck the casing during an impact, and this arrangement did provide effective mechanical protection.

The disadvantages with the use of a lens, apart from extra space, weight, and cost, are that the lens interferes with light transmissibility, which can be critical especially when the screen is in reflective, rather than back-lit, mode. Battery life is critical in PDAs, whereby the designer arranges to maximise the time spent in reflective mode, whereby the time spent in back-lit mode is minimised. The provision of the springy tabs is useful in enabling the mounted screen unit to be properly resistant to impact damage, without the need to resort to a covering lens.

It should be understood that it is the combination of the springy tabs with the foam cushions that is effective to protect the screen unit from impacts. It is not suggested that the springy tabs would be sufficient, on their own (i.e without the foam cushions), in most cases, to properly protect the screen unit. In the type of edge-impact as illustrated in FIG. 11, the foam material (and the adhesive) is stressed in shear, and thus the foam absorbs a good fraction of the impact energy. Similarly, just the foam on its own gives barely adequate protection, as experience has shown.

On the other hand, it can be worth including the springy tabs even in a case where the extra impact resistance is really not required. That is to say, the other function of the springy tabs can be important, in that the springy tabs assist in locating the screen unit in exactly the right position just prior to pressing the screen unit down onto the adhesive. This function would be useful even if the screen unit were glued directly to the casing, rather than to the foam cushion—although, of course, screen units are almost invariably mounted in foam cushions.

Figure 5A:
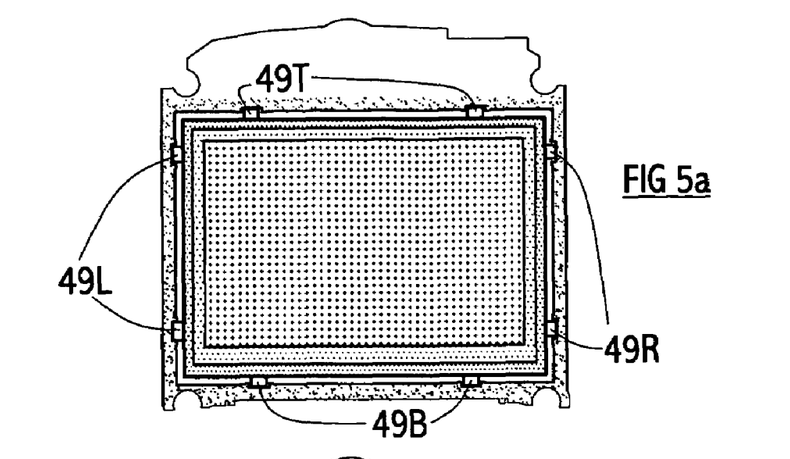
FIG. 5a is a diagrammatic plan view of a mounted screen assembly similar to that shown in FIG. 1.

The expression "springy tab" as used herein refers to the whole springy tab that is present along one side of the screen unit. In a case where two springy tab elements are provided on the same side, e.g two on the left side of the screen, and those two elements are stressed in the same sense by an impact, those two tab elements would be regarded as sub-components of one single springy tab on the left side. As shown in FIG. 5a, the screen unit has been provided with eight springy tab elements, two each side; elements 49T on the top, 49B on the bottom, 49L on the left, and elements 49R on the right.

Figure 5B:
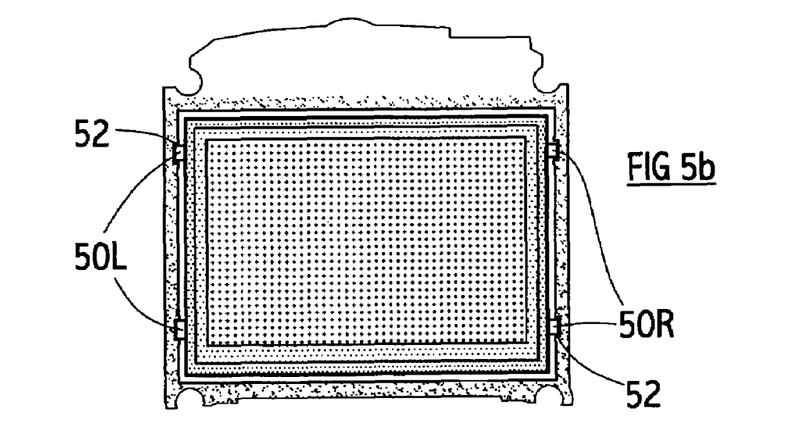
FIG. 5b is similar to FIG. 5a, showing another mounted screen assembly.

It is not necessary to provide eight tab elements in every case, however. As shown in FIG. 5b, only four tab elements are provided, two 50L to the left and two 50R to the right sides, and none to the top and bottom sides. (FIG. 5b corresponds to the components shown in FIG. 4 in this respect.) Now, in order to hold the screen unit restrained against top/bottom impacts, the left and right tab elements should be tight laterally, i.e tight in the top/bottom direction, in their sockets 52 in the mounting frame. It has been found that the springy tabs, when tight in their sockets, have a more or less similar resilience in the top/bottom direction as they have in the left/right direction. It is not necessary that all four tab elements be a tight fit in their respective sockets.

Figure 5C:
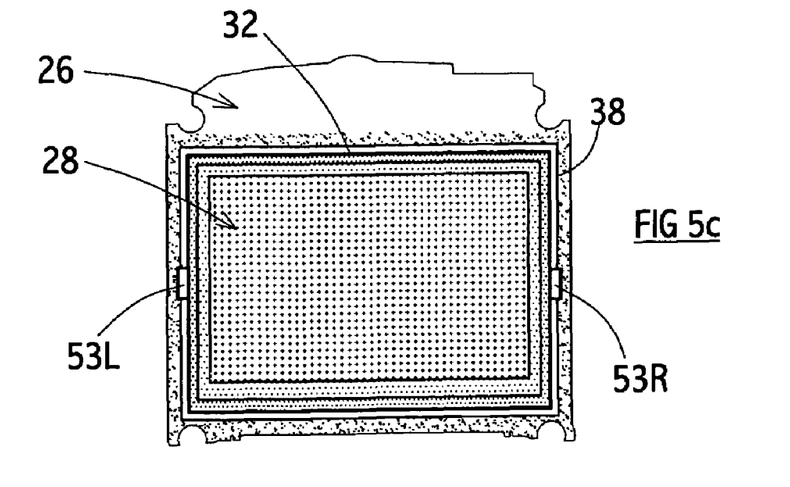
FIG. 5c is similar to FIG. 5a, showing a further mounted screen assembly.

In FIG. 5c, the number of springy tabs 53L, 53R has been reduced to two. This of course is the minimum. Four is preferred (FIG. 5b), as giving a rather greater degree of resistance to the type of impact that causes the screen unit to rotate in the plane of FIG. 5b. Sometimes the designer has less space in which to place the springy tabs on the top and bottom edges rather than on the left and right edges, because of the other components (e.g wiring ribbons, etc) associated with the top and bottom, whereby the FIG. 5b arrangement again is preferred.

What is claimed is:

1. A screen unit for a hand-held electronic device, wherein:
   the screen unit comprises a shell and a stack of layers;
   an uppermost one of the layers comprises a generally flat display screen, which, in plan view of the screen unit, has an outer periphery;
   another one of the layers in the stack is a metal backing plate;
   the metal backing plate is mainly flat, and defines a flat plane of the backing plate;
   the display screen is carried rigidly in the metal backing plate;
   the metal backing plate includes a number N of springy tabs, where N is at least two, and in respect of each springy tab:
      the springy tab comprises a fold of the metal of the backing plate, in which the metal is bent out of the flat plane of the backing plate;
      in plan view, the springy tab protrudes outwards from the outer periphery of the display screen;
      the screen unit is so configured that the springy tab is able to undergo resilient deflection in direction D, being a direction that lies parallel to the flat plane of the backing plate and is directed inwards with respect to the periphery of the display screen; and
   the springy tab is able to absorb energy from an impact to the screen unit.

2. The screen unit of claim 1, wherein, in respect of each springy tab, the springy tab has a spring rate such that the springy tab deflects in the direction D through a distance T, when a deflecting force is not less than ten times, and not more than forty-five times the screen unit weight.

3. The screen unit of claim 1, wherein, in respect of each springy tab, the springy tab is bent upwards from the flat plane of the backing plate.

4. The screen unit of claim 1, wherein the periphery of the screen unit has two opposed sides, and the springy tabs are arranged one on each of the opposed sides.

5. The screen unit of claim 1, wherein:

the screen unit in plan view forms a rectangle; and the springy tab is itself flat, being formed as a simple single fold, protruding from one side of the rectangle, and the fold lies parallel to that one side.

6. The screen unit of claim 1, wherein:

the mainly flat metal backing plate has an upturned rim; and tags in the rim are crimped into corresponding recesses in the shell, whereby the backing plate is secured rigidly to the shell.

7. A screen assembly comprising:

a screen unit wherein a metal backing plate includes a number N of springy tabs, where N is at least two, and each springy tab is able to absorb enemy from an impact to the screen unit;

a mounting frame wherein:

movement of the screen unit in a direction D is movement of the screen unit relative to the mounting frame;

the mounting frame includes a plastic moulding, having a lip;

the screen unit lies assembled into the mounting frame, and the lip at least partially surrounds a periphery of the screen unit;

the lip has an inwards-facing abutment surface; and the configuration of the combination is such that the N springy tabs protruding from the periphery of the screen unit touch the inwards-facing abutment surface, upon the combination being subjected to an impact in the direction D, thereby inhibiting the screen unit itself from touching the mounting frame.

8. The screen assembly of claim 7, wherein, in respect of each springy tab, the screen assembly is so configured that the springy tabs are able to undergo resilient deflection in direction D, relative to the mounting frame, where the resilient deflection is at least one quarter millimeter, and preferably is at least a half-millimeter.

9. The screen assembly of claim 7, wherein:

the screen unit in plan view forms a rectangle, and at least one of the springy tabs comprises sub-components of two or more separate tab elements, located both or all on a common side of the rectangle.

10. The screen assembly of claim 9, wherein:

the two or more separate tab elements are rectangular in cross-section, the thickness thereof being equal to a thickness T of the backing plate, each of the two or more separate tab elements having a height overall of H mm, and a width of W mm;

where T=0.2 mm, H=3.5 mm, and W=3.5 mm.

11. The screen assembly of claim 7, wherein the assembly includes an impact absorber, comprising a layer of resilient foam material, lying between the screen unit and the mounting frame.

12. The screen assembly of claim 11, wherein the layer of foam material is secured by adhesive to the mounting frame, and by adhesive to the screen unit.

13. The screen assembly of claim 11, wherein the lip of the mounting frame and the springy tabs are so configured with respect to each other that;

(a) prior to the screen unit being secured to the mounting frame:

the screen unit can be placed with the springy tabs thereof resting on the lip of the mounting frame;

with the screen unit thereby prevented from making contact with the securing adhesive by which the screen unit is secured to the mounting frame; and (b) the screen unit can thereupon be pressed into contact with the securing adhesive.

14. The screen assembly of claim 7, wherein, in respect of at least one of the springy tabs, the lip of the mounting frame includes a socket, which is of such width as to be a tight fit on the width of the springy tab.

15. The screen assembly of claim 7, wherein the mounting frame lies secured rigidly into a casing of a hand-held electronic device.

16. The screen unit of claim 1, wherein each springy tab is integral to the metal of the backing plate.

* * * * *

UNITED STATES PATENT AND TRADEMARK OFFICE
CERTIFICATE OF CORRECTION

PATENT NO. : 7,697,275 B2
APPLICATION NO. : 10/933264
DATED : April 13, 2010
INVENTOR(S) : Chao Chen et al.

It is certified that error appears in the above-identified patent and that said Letters Patent is hereby corrected as shown below:

Column 7, line 19 claim 7, delete "enemy" and insert therefor --energy--.

Signed and Sealed this

Thirteenth Day of July, 2010

David J. Kappos
*Director of the United States Patent and Trademark Office*